United States Patent [19]

Aoyama et al.

[11] Patent Number: 4,826,654
[45] Date of Patent: May 2, 1989

[54] FUEL ASSEMBLY

[75] Inventors: Motoo Aoyama; Yasunori Bessho; Yuichi Morimoto, all of Hitachi; Hiromi Maruyama; Sadao Uchikawa, both of Katsuta, all of Japan

[73] Assignee: Hitachi, Ltd., Tokyo, Japan

[21] Appl. No.: 946,960

[22] Filed: Dec. 29, 1986

[30] Foreign Application Priority Data

Dec. 25, 1985 [JP] Japan .................................. 60-290626

[51] Int. Cl.$^4$ ................................................ G21C 3/32
[52] U.S. Cl. ...................................... 376/444; 376/435
[58] Field of Search .................... 376/444, 447, 435

[56] References Cited

U.S. PATENT DOCUMENTS

| | | | |
|---|---|---|---|
| 3,802,995 | 4/1974 | Fritz et al. | 376/435 |
| 4,526,746 | 7/1985 | Fredin | 376/444 |
| 4,632,805 | 12/1986 | Suchy | 376/444 |
| 4,652,426 | 3/1987 | Boyle et al. | 376/444 |
| 4,664,882 | 5/1987 | Doshi | 376/444 |
| 4,675,154 | 6/1987 | Nelson et al. | 376/444 |
| 4,686,079 | 8/1987 | Ishikawa et al. | 376/444 |
| 4,708,846 | 11/1987 | Patterson | 376/444 |
| 4,777,016 | 10/1988 | Yoshioka et al. | 376/444 |
| 4,781,885 | 11/1988 | Lill et al. | 376/444 |

FOREIGN PATENT DOCUMENTS

| | | | |
|---|---|---|---|
| 0050498 | 4/1971 | Japan | 376/444 |
| 0166893 | 9/1984 | Japan | 376/444 |
| 2000892 | 1/1987 | Japan | 376/444 |

Primary Examiner—Deborah L. Kyle
Assistant Examiner—Daniel Wasil
Attorney, Agent, or Firm—Antonelli, Terry & Wands

[57] ABSTRACT

A fuel assembly comprises a plurality of fuel rods, moderator rods disposed among the fuel rods, upper and lower tie plates for holding both end portions of the fuel rods and the moderator rods, and fuel spacers for keeping distances between the fuel rods and the moderator rods constant. The fuel assembly is characterized in that there is provided a space region extending from the upper tie plate to the lower tie plate and having a space enough to dispose at least one of the fuel rods. At least one of the moderator rods being disposed adjacent to the space region. The fuel rods, the moderator rods, and the space region are disposed in a grid form.

13 Claims, 7 Drawing Sheets

FUEL ASSEMBLY

BACKGROUND OF THE INVENTION

This invention relates to a fuel assembly, and more particularly to a fuel assembly which can be loaded suitably into a boiling water reactor.

A conventional fuel assembly loaded into a boiling water reactor comprises a channel box having a square tubular form and a fuel bundle disposed inside the channel box. This fuel bundle consists of an upper tie plate for fitting the channel box, a lower tie plate inserted into the lower end portion of the channel box, a plurality of spacers, disposed inside the channel box and spaced from one another in an axial direction, and a plurality of fuel rods and water rods each having their both end portions fixed to the upper and lower tie plates while passing through the spacers. In this fuel assembly, cooling water under a slightly unsaturated state flows among the fuel rods through holes of the lower tie plate. While it flows from the lower portion to the upper portion among the fuel rods, the cooling water is heated, boiled to a two-phase flow and flows out of holes of the upper tie plate. The void fraction at the outlet of the fuel assembly is about 70%, and the upper portion of the fuel assembly is under a state short of light water as a neutron moderator.

Control rods and neutron detector instrumentation pipes are interposed among the fuel assemblies. Accordingly, the space among the fuel assemblies must be wide enough to dispose them, and fuel rods disposed around the peripheral portion of each fuel assembly are encompassed by a greater quantity of water than the fuel rods that are disposed at the center.

As described above, the cooling water in the fuel assembly under the state of operation has two-phase flow portions and the portions of saturated water portions distributed unevenly in both horizontal and vertical directions. The nuclear characteristics of the fuel assembly depend upon the ratio of the moderator to the fuel, and the nuclear characteristics of the conventional fuel assembly remarkably vary depending upon the position.

As a structure which makes the moderator/fuel ratio at each position of the fuel assembly close to an optimal value and improves such a nonhomogeneous moderator effect, water rods are used. In addition, a structure which further improves a moderator effect by the water rods described above is disclosed in Japanese Patent Laid-Open No. 50498/1977. In this prior art reference, a path for the moderator (two-phase flow) which expands progressively upward is disposed inside the fuel assembly, or moderator rods arranged so that the total cross-section expands progressively upward are provided.

Among the conventional methods described above, those which use the water rods or the moderator rods do not take into consideration increasing of a necessary fuel enrichment or shortening of fuel life due to a decrease of fuel loaded according to loading of the water rods or the moderator rods, and have low economical efficiency of fuel. In case a necessary amount of fuel to be loaded is maintained by increasing the diameter of the fuel rods from the aspect of fuel cycle economy, however, any consideration is not made to the decrease of the area of a coolant flow path and the increase in a wetted perimeter, so that the pressure drop in the fuel assembly increases.

SUMMARY OF THE INVENTION

It is therefore an object of the present invention to provide a fuel assembly which can improve the fuel cycle economy without reducing the fuel inventory and without increasing the pressure drop in the fuel assembly.

The object of the invention described above can be accomplished by an arrangement wherein a space region which extends from a lower tie plate to an upper tie plate and is large enough to dispose at least one fuel rod is provided, at least one of moderator rods is arranged adjacent to the space region, and the fuel rods, the moderator rods and the space region are arranged in a grid form.

Since the space region extending from the lower tie plate to the upper tie plate and large enough to dispose at least one fuel rod is disposed adjacent to the moderator rods, the void fraction of the space region becomes lower than the mean or average void fraction of the fuel assembly so that the reactivity increases. The space region adjacent to the moderator rods functions in the same way as the moderator rods at a high void fraction and at a low void fraction, on the other hand, the homogenization effect increases in the radial direction of the fuel assembly owing to the increase in the number of hydrogen atoms, and the reactivity increases owing to the decrease of the neutron absorption quantity because of the absence of any cladding.

Since no cylindrical pipe exists in the space region, the cross-sectional area of various pipes in the fuel assembly total and the wetted area decrease. Accordingly, the pressure drop in the fuel assembly decreases, too.

DESCRIPTION OF THE PREFERRED EMBODIMENTS

Hereinafter, some preferred embodiments of the invention will be described in detail, referring to the drawings.

Embodiment 1

An embodiment of a fuel assembly for use in a boiling water reactor according to the present invention will be described referring to FIGS. 1 and 2.

Figure 1:
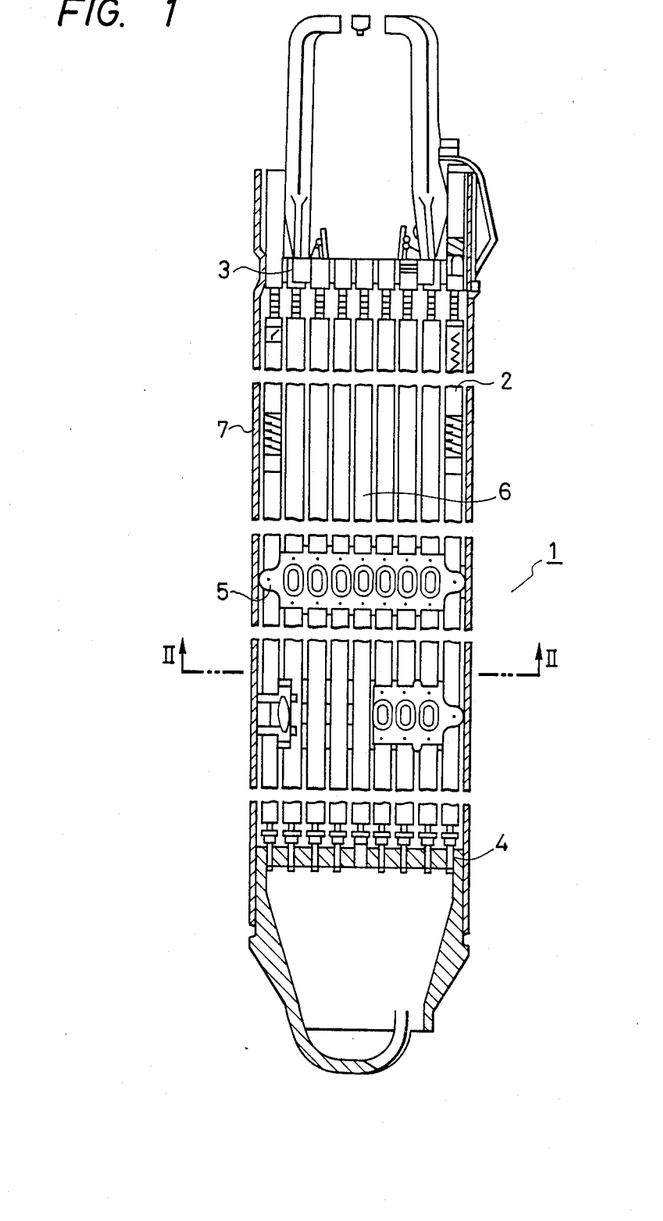
FIG. 1 is a longitudinal sectional view of the fuel assembly of an embodiment of the present invention.

In FIG. 1, the fuel assembly 1 comprises a plurality of fuel rods fixed at both end portions by upper and lower tie plates 3, 4, water rods 6 disposed among the fuel rods 2, a plurality of fuel spacers 5 disposed in an axial direction to keep the fuel rods 2 and the water rods 6 in a predetermined laterally spaced relation, and a channel box 7, fitted to the upper tie plate 3, extending downwards so as to encompass the bundle of the fuel rods 2 and mounted on the lower tie plate 4.

Figure 2:
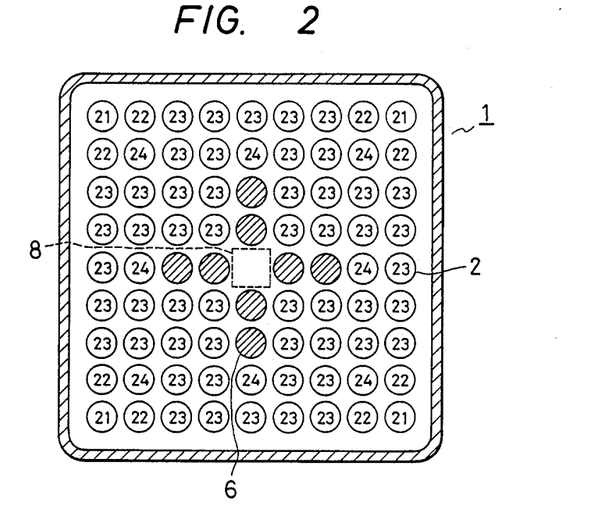
FIG. 2 is a sectional view of the fuel assembly taken along a line II—II of FIG. 1.

In FIG. 2, a space region 8 is formed at the center on the cross-sectional plane of the fuel assembly 1. The lower end of this space region 8 is positioned on the upper surface of the lower tie plate 4, and its upper end on the lower surface of the upper tie plate 3. The water rods 6 are disposed radially so as to extend outwards from the space region 8 every two of the water rods 6 (towards the four sides of the channel box 7). The space region 8 is encompassed by four water rods 6 and is represented by a square of dotted line in FIG. 2 for convenience' sake. In practice, however, any structure expressed by the square of the dotted line does not exist. When the fuel assemblies 1 are outside the reactor, the space region 8 is a mere space but when they are loaded in the reactor, it serves as a passage of cooling water. Four water rods 6 are directly adjacent to the space region 8, that is, the four water rods 6 face to the space region 8. The size of the space region 8 is such that one fuel rod 2 or one water rod 6 can be disposed. The fuel rods 2, the water rods 6 and the space region 8 are arranged in a grid form as shown in FIG. 2.

Four kinds of fuel rods 21–24 are used as the fuel rods 2 as shown in Table 1. Though the fuel rods 21–23 do not contain gadolinium which is an burnable poison the fuel rod 24 does. The enrichment is 1.8 wt % for the fuel rod 21, 2.5 wt % for the fuel rod 22 and 3.3 wt % for the fuel rods 23 and 24.

TABLE 1

| Fuel Rod No. | 21 | 22 | 23 | 24 |
|---|---|---|---|---|
| enrichment (wt %) | 1.8 | 2.5 | 3.3 | 3.3 |
| gadolinium (wt %) | — | — | — | 3.5 |
| number of rods | 4 | 8 | 52 | 8 |

After the fuel assembly 1 of this embodiment 1 is loaded into the core of a boiling water reactor, the reactor is started to operate. During the operation of the boiling water reactor, cooling water flows into the fuel assembly 1 from the lower tie plate 4. This cooling water rises through the gaps formed among the fuel rods 2 and through the water rods 6 and the space region 8. During this elevation process, the cooling water is heated while it cools the fuel rods 2 and part of the cooling water changes to a vapor. Since the cooling water flows into the water rods 6 in the proximity of the upper surface of the lower tie plate 4, hardly any vapor is contained in the cooling water flowing inside the water rods 6. The vapor rises through the gaps among the fuel rods 2 and through the space region 8. In this embodiment, since the water rods 6 are adjacent to the space region 8, the void fraction of the space region 8 is lower than the mean void fraction of the fuel assembly 1 for the following reason.

Figure 3:
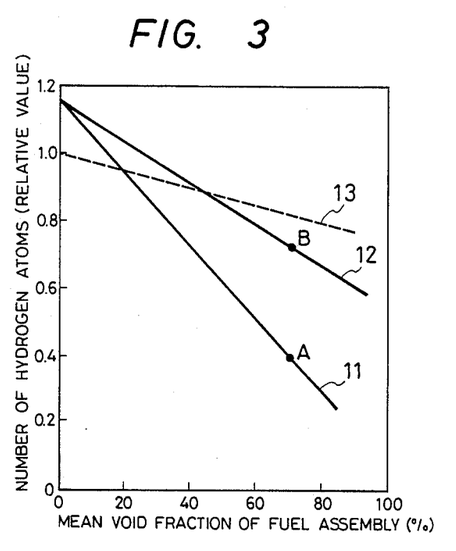
FIG. 3 is a characteristic diagram showing the relation between the number of hydrogen atoms and a void fraction.

FIG. 3 shows the influences of the difference of relative position between the space region 8 and the water rod 6 upon the number of hydrogen atoms in the space rod region 8 by the use of the mean void fraction of the fuel assembly as a parameter. The reference value uses the number of hydrogen atoms in a unit cell for the water rod when the mean void fraction of the fuel assembly is 0%. The term "unit cell" hereby means one of square defined by orthogonally intersecting grid plates in a grid-like fuel spacer constituted by mutually crossing and different grid plates disposed in x and y directions, that is, the unit cell corresponds to a space 8 defined by the dotted line. A characteristic line 11 represent characteristics when the fuel rods 2 are disposed in all the unit cells adjacent to the space region 8 and a line 12 represent characteristics when a half of the unit cells adjacent to the space region 8, that is, 4, are filled with water rods 6 as shown in FIG. 2.

The number of hydrogen atoms in the space region 8 at a low void fraction is greater than that in the water rod 6 represented by characteristics 13 by the number that corresponds to the absence of a hollow pipe of the water rod 6, irrespective of the relative position to the water rod. Under the high void fraction state where nonhomogeneity in both the axial and radial directions in the fuel assembly becomes the greatest, however, the number of hydrogen atoms in the space region 8 in which the fuel rods are disposed in all of the adjacent unit cells drops remarkably when compared with the number of hydrogen atoms of the water rod 6 (see the characteristics 11).

On the other hand, in the space region 8 in which the water rods 6 are disposed in the half of the adjacent unit cells (see FIG. 2), the number of hydrogen atoms at a void fraction of up to 40% is greater than that of the water rod 6, and even at a void fraction higher than 40% the number of hydrogen atoms does not drastically drop when compared with that of the water rod 6. This results from the phenomenon that in the fuel assembly 1 having the water rods 6 disposed therein, the distribution of the void fractions inside the channel box 7 changes greatly depending upon the position. In other words, when the fuel rods 2 are disposed in all the unit cells adjacent to the space region 8, the void fraction of the space region 8 increases to a level substantially equal to the mean void fraction of the fuel assembly, and when the water rods 6 are disposed in the unit cells adjacent to the space region 8, the void fraction of the space region 8 becomes by far smaller than the mean void fraction of the fuel assembly 1 in the same way as in the region inside the water rod 6.

In FIG. 3, when the mean void fraction of the fuel assembly 1 is 70%, the number of hydrogen atoms of the characteristics 12 increases by about 70% in comparison with that of the characteristics 11. This is a decrease of only about 10% in comparison with the case of the water rod 6. Furthermore, when the reducing effect of the void fraction in the water rods 6 adjacent to the space region 8 due to disposition of the space region 8 is taken into consideration, the space region 8 of the characteristics 12 has the number of hydrogen atoms substantially equal to that of the water rod 6.

Figure 4:
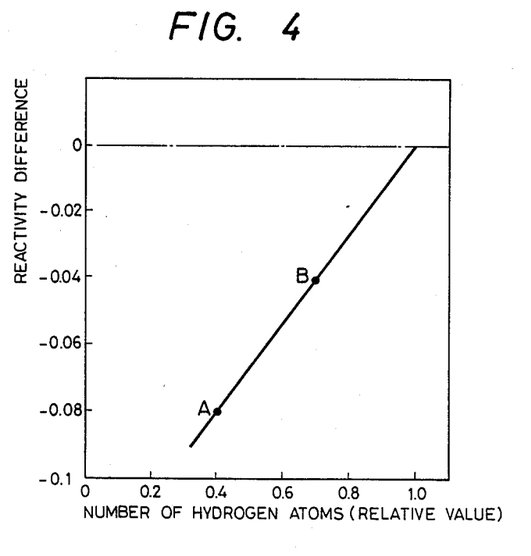
FIG. 4 is a characteristic diagram showing the relation between the reactivity and the number of hydrogen atoms.

FIG. 4 shows the relation between the number of hydrogen atoms and reactivity in order to represent the nuclear effect of the characteristics 11 and 12. For example, the reactivity at a mean void fraction of 70% of the assembly rises by about 0.04% $\Delta K_\infty$ owing to the change from the point A to the point B in FIG. 3. In other words, it can be understood that when the water rods are disposed in the unit cells adjacent to the space region 8, the space region 8 exhibits substantially the same nuclear function as the water rods 6 at a high void fraction. At a low void fraction, the reactivity of the space region 8 increases by about 0.05% $\Delta K_\infty$ (per space region for one unit cell) in comparison with the water rod 6 due to the increase of the homogenization effect in the radial direction of the fuel assembly resulting from the increase in the number of hydrogen atoms and due to the decrease of the neutron absorption quantity resulting from the absence of the hollow pipe. In this manner, since the water rods 6 and the space region 8 are adjacent to one another in the fuel assembly 1 of this embodiment, the reactivity can be improved and hence, fuel cycle economy can be improved, too.

Figure 5:
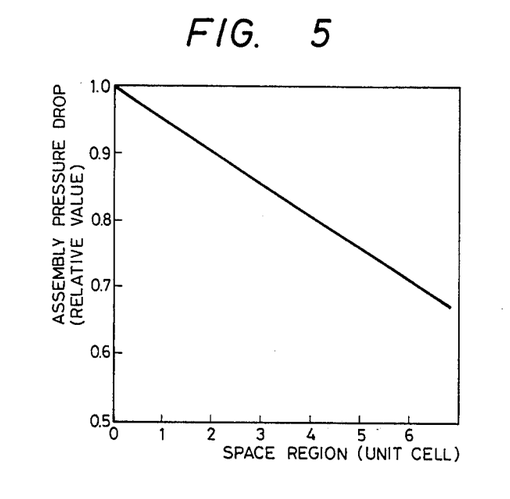
FIG. 5 is a characteristic diagram showing the relation between a space region and a pressure drop.

On the other hand, the pressure drop reducing effect of the space region 8 is not dependent upon its relative position with the water rod 6 but is dependent upon the area of the space region 8. FIG. 5 shows a relation between the area of the space region 8 and the pressure drop. In this embodiment, as the cross-sectional area of the pipes disposed in the fuel assembly and the wetted area decrease when compared with the case where the water rods 6 are disposed inside the space region 8, too, the pressure drop can be reduced.

Obviously, the fuel assembly 1 of this embodiment is superior to the fuel assembly using only the water rods 6 from the aspects of the pressure drop and economical efficiency of fuel. Though only reduction of the pressure drop has been described as the effect of increasing the flow path area by the space region 8, the following can also be accomplished by limiting the reduction of the pressure drop when there is a sufficient margin for the pressure drop:

(i) promotion of uniformity of fuel assembly structure by the increase in the number of water rods; and (ii) extension of life of fuel assembly by increasing uranium loading quantity.

Figure 6:
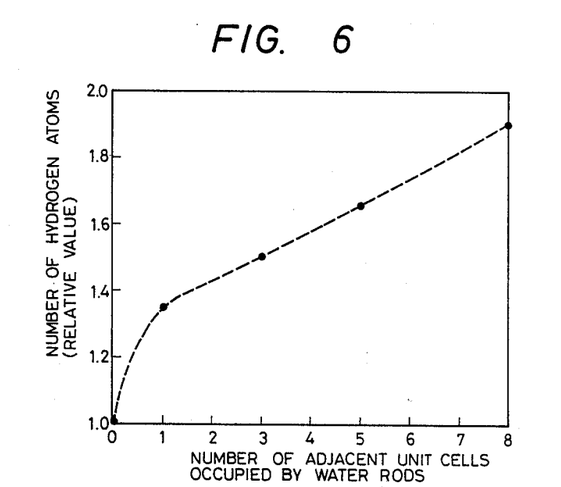
FIG. 6 is a characteristic diagram showing the relation between the number of water rods occupying adjacent unit cell and the number of hydrogen atoms.

The effect described above is not limited to the case where the water rods 6 are disposed in the half of the unit cells adjacent to the space region 8 as in the fuel assembly 1 shown in FIG. 2. FIG. 6 shows a relation between the number of water rods 6 occupying the unit cells adjacent to the space region 8 and the number of hydrogen atoms in the space region 8. It can be understood from FIG. 6 that if the water rod 6 is disposed in at least one of adjacent unit cells, the effect described above can be obtained.

Figure 7A:
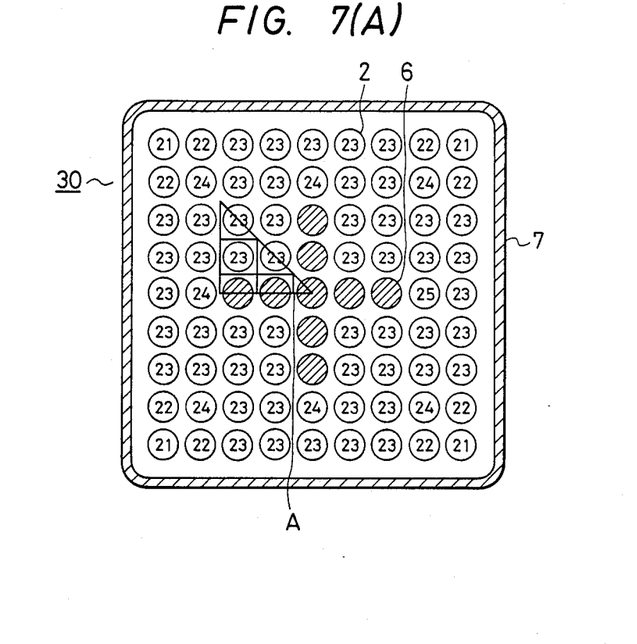
FIG. 7(A) is a transverse sectional view of an imaginary fuel assembly.
Figure 7B:
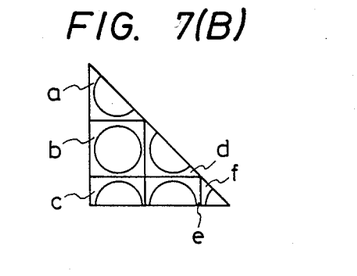
FIG. 7(B) is a view showing a region A of FIG. 7(A)

The enrichment distribution which shows the effect of this embodiment (shown in FIG. 2) in comparison with the fuel assembly 30 shown in FIG. 7(A), which is obtained by replacing the space region 8 of this embodiment by the water rod 6, is the same as that of this embodiment. The void fraction of the flow passage in the region A shown in FIG. 7(B) is compared with respect to this embodiment and the fuel assembly 30 in FIG. 7(A). The result at the upper end of the fuel assembly is shown in Table 2. In this embodiment, the void fraction drops not only in the region f which is the space region 8 but also in the regions d and e which are adjacent unit cells. As a result, the number of hydrogen atoms in the region A is substantially equal in the fuel assembly 1 of this embodiment and in the fuel assembly 30 in FIG. 7(A).

TABLE 2

| Region | Embodiment 1 | FIG. 7(A) |
| --- | --- | --- |
| a | 67.4% | 67.9% |
| b | 62.8 | 62.5 |
| c | 60.1 | 59.9 |
| d | 55.4 | 56.4 |
| e | 51.0 | 53.2 |
| f | 45.4 | 49.6 |

Therefore, the neutron infinite multiplication factor is equal to that of the fuel assembly 30 at the upper part of the fuel assembly 1 and is higher by about 0.05 $\Delta K_\infty$ at its lower part than that of the fuel assembly 30. On the other hand, the pressure drop in the fuel assembly 1 is lower by about 3% (about 0.021 Kg/cm$_2$) than that of the fuel assembly 30.

In the embodiment described above, the arrangement of the fuel rods and the like is 9 rows by 9 columns inside the fuel assembly by taking into consideration the fact that since a large number of water rods are disposed, the number of fuel rods decreases and the linear output density increases. However, the concept of this embodiment can of course be applied to fuel assemblies having the arrangement of 10 rows by 10 columns and 11 rows by 11 columns. In recent years, a fuel assembly capable of increasing the linear power density has been developed by bonding a Cu or Zr thin film on the inner wall of a cladding pipe to decrease the interaction between fuel pellets and the cladding pipe. In the case of such a fuel assembly, the arrangement of the fuel rods of 8 rows by 8 columns can be employed.

Figure 8:
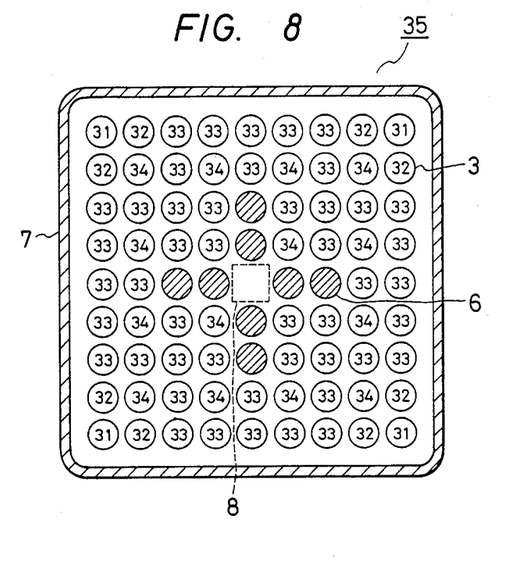
FIG. 8 is a sectional view of a fuel assembly showing an example of an application of the present invention.

A fuel assembly 35 shown in FIG. 8 is another application example of Embodiment 1. The fuel assembly 35 increases the mean enrichment of the fuel assembly 1 in Embodiment 1 by about 4 wt %. As fuel rods 3 in this fuel assembly 35, four kinds of fuel rods 31–34 as shown in Table 3 are used.

TABLE 3

| Fuel rod number | 31 | 32 | 33 | 34 |
| --- | --- | --- | --- | --- |
| enrichment (wt %) | 3.0 | 3.6 | 4.5 | 3.3 |
| gadolinium (wt %) | — | — | — | 4.5 |
| number of rods | 4 | 8 | 46 | 14 |

If the enrichment is increased in a conventional fuel assembly, the moderation effect of neutrons drops so that the worth of the control rod decreases and the void coefficient (absolute value) increases. On the other hand, when a large number of water rods 6 are disposed to obtain a synergistic effect with the space region 8 as in this embodiment, hardly any increase in the pressure drop in the fuel assembly occurs and in addition, the moderation effect of neutrons can be increased. As a result, fuel cycle economy can be improved by about 7% in comparison with the conventional fuel assembly and a surplus linear power density at the stop of reactor can be limited to substantially the same level as the one in the case where the enrichment is about 3 wt %.

Embodiment 2

Figure 9A:
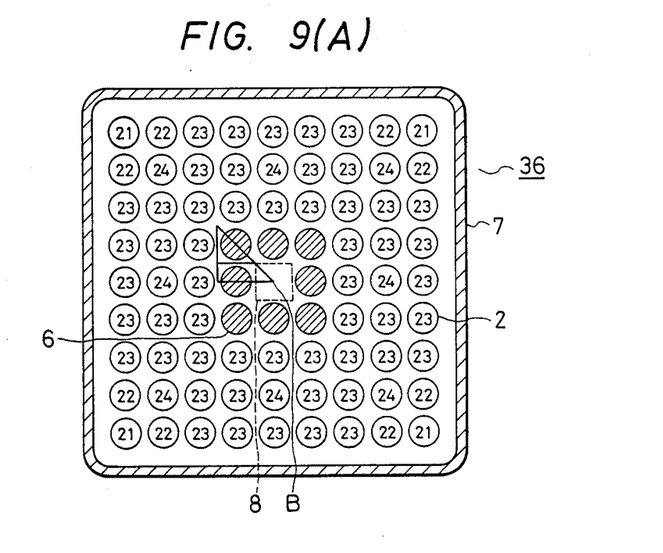
FIG. 9(A) is a sectional view of a fuel assembly of another embodiment of the present invention.
Figure 9B:
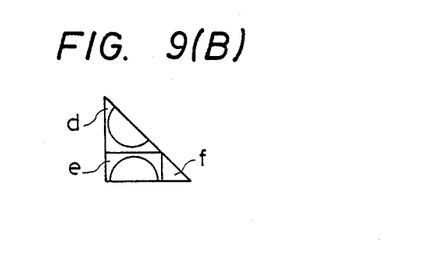
FIG. 9(B) is a view showing a region A of FIG. 9(A)

FIG. 9(A) is a cross-sectional view of a fuel assembly 36 in another embodiment of the invention. In the fuel assembly 36 of this embodiment, the positions of the water rods 6 are different from those of the fuel assembly 1 in Embodiment 1. The fuel rods 2 are the same as in the Embodiment 1, using the fuel rods 21-24. In this embodiment, the water rods 6 are disposed in all the unit cells adjacent to the space region 8. Since the water rods 6 and the space region 8 are adjacent to one another in this embodiment, too, the same function as that of Embodiment 1 develops. The void fraction of the flow passage of the region B of FIG. 9(B) in this fuel assembly 36 is compared with fuel assembly obtained by replacing the space region 8 of this fuel assembly 36 by the water rods 6. The effect at the upper end of the fuel assembly 36 is shown in Table 4 and the effect is greater than in Embodiment 1. At the lower part of the fuel assembly 36, that is, in the low void region, however, the improvement in reactivity is less than at the lower part of the fuel assembly 1. On the other hand, the pressure drop in the fuel assembly 36 decreases by about 3% (about 0.021 Kg/cm$^2$) in comparison with the fuel assembly 30 shown in FIG. 7(A).

TABLE 4

| Region | Embodiment 2 | Fuel Assembly having water rods in place of space region of FIG. 9(A) |
|---|---|---|
| d | 55.7% | 56.7% |
| e | 50.5 | 53.1 |
| f | 42.5 | 48.1 |

Embodiment 3

Figure 10:
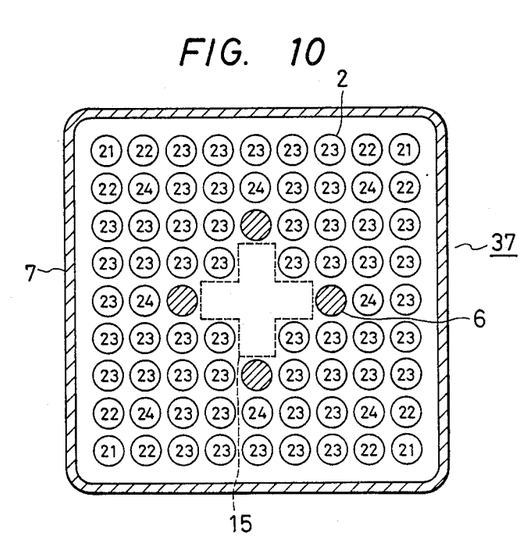
FIG. 10 is a sectional view of a fuel assembly of another embodiment of the present invention.

FIG. 10 is a cross-sectional view of a fuel assembly 37 in accordance with still another embodiment of the present invention. This embodiment has a space region 15 which is five times greater than the space region of Embodiment 1 in order to improve the reducing effect of the pressure drop in the fuel assembly. The water rods 6 are disposed in four of unit cells 16 adjacent to the space region 15. The void fraction of the flow passage in the region A shown in FIG. 7(B) is compared between the fuel assembly of this embodiment and that of FIG. 7(A) in the same way as in Embodiment 1. The result at the upper end of the fuel assembly is shown in Table 5. Though the effect is smaller than in Embodiment 1, the void fraction is lower. At a low void fraction, since the neutron absorption quantity by the hollow pipe decreases, the neutron infinite multiplication factor is improved by about 0.2% $\Delta K_\infty$ than that of fuel assembly shown in FIG. 7(A).

TABLE 5

| Region | Embodiment 3 | FIG. 7(A) |
|---|---|---|
| a | 68.4% | 67.9% |
| b | 62.5 | 62.5 |
| c | 59.2 | 59.9 |
| d | 54.9 | 56.4 |
| e | 51.4 | 53.2 |
| f | 48.3 | 49.6 |

As to the pressure drop in the fuel assembly, on the other hand, it decreases by about 13% (about 0.084 Kg/cm$^2$) in comparison with that in the fuel assembly shown in FIG. 7(A).

Though each of the embodiments described above uses the water rod as the moderator rod, the same effect can be obtained when a moderator rod having sealed therein a solid moderator material having a high hydrogen density and a small neutron absorption cross-section is used in place of the water rod. When a burnable poison is mixed in the solid moderator rod, the void fraction distribution of the fuel assembly becomes further greater.

In accordance with the present invention, since the space region and the moderator rods are disposed adjacent to each other, the reactivity of the fuel assembly can be improved, the fuel cycle economy can be improved and the sectional area of the coolant flow passage can be increased so that the pressure drop in the fuel assembly can be reduced.

What is claimed is:

1. A fuel assembly comprising a plurality of fuel rods, moderator rods disposed among said fuel rods, upper and lower tie plates for holding both end portions of each of said fuel rods and said moderator rods and fuel spacers for keeping spaces between said fuel rods and said moderator rods as wide as a predetermined width, the improvement wherein there is provided a space region substantially void of any solid, extending in an axial direction from said lower tie plate to said upper tie plate and having a space sufficient to disposed at least one of said fuel rods therein, at least one of said moderator rods being disposed immediately adjacent to said space region for delimiting a boundary of said space region in a direction transverse to the axial direction, said upper and lower tie plates delimiting a boundary of said space region in the axial direction, and said fuel rods, said moderator rods and said space region being disposed in a grid form, said space region having substantially the same cross-sectional area from an upper end portion thereof proximate to said upper tie plate to a lower end portion thereof proximate to said lower tie plate.

2. A fuel assembly as defined in claim 1, wherein said moderator rod is a water rod.

3. A fuel assembly as defined in claim 1, wherein said space region is disposed in a central portion of a bundle of said fuel rods and said water rods.

4. A fuel assembly as defined in claim 3, wherein wherein said space region corresponds to a unit cell which which has a space as wide as one of said fuel rods and said moderator rods being positioned to surround said space region.

5. A fuel assembly as defined in claim 4, wherein said space region is encompassed by eight of said water rods so as to face directly said eight water rods.

6. A fuel assembly as defined in claim 4, wherein said space region is encompassed by four pairs of said water rods so as to face directly one of each said pair of water rods, and each of said pairs of water rods are arranged radially.

7. A fuel assembly as defined in claim 3, wherein said space region corresponds to five unit cells each of which has a space as wide as one of said fuel rods, said moderator rods being disposed to surround said space region.

8. A fuel assembly comprising:
a channel box axially elongated;
a plurality of fuel rods disposed in said channel box;
a plurality of moderator rods disposed among said fuel rods;
upper and lower tie plates holding both end portions of said fuel rods and said moderator rods, respectively;
fuel spacers for keeping spaces between said fuel rods and said moderator rods as wide as a predetermined width;
a space region substantially void of any solid positioned at a central portion of said channel box, said space region extending in the axial direction from said lower tie plate to said upper tie plate so as to be delimited in the axial direction by said lower and upper tie plates, and a space size of said space region being such that at least one of said fuel rods can be disposed therein;

wherein at least four of said moderator rods are disposed immediately adjacent to said space region so that each of said four moderator rods faces said space region and for a boundary of said space region in a direction transverse to the axial direction; and wherein said space region has substantially the same cross-sectional area along the axial direction from an upper end portion thereof to a lower end portion thereof.

9. A fuel assembly as defined in claim 8, wherein each of said moderator rods is a water rod and said water rods are arranged symmetrically with respect to said space region.

10. A fuel assembly comprising:
a channel box axially elongated;
a plurality of fuel rods disposed in said channel box;
a plurality of moderator rods disposed among said fuel rods;
upper and lower tie plates holding both end portions of said fuel rods and said moderator rods, respectively;
fuel spacers for keeping spaces between said fuel rods and said moderator rods as wide as a predetermined width;
means for delimiting a space region substantially void of any solid at a predetermined portion of said channel box and a size sufficient to enable at least one of said fuel rods to be disposed therein, said means delimiting said space region in the axial direction of said channel box including said upper and lower tie plates and in a direction transverse to the axial direction including at least one moderator rod disposed immediately adjacent to said space region so that said at least one moderator rod faces said space region and forms a part of a boundary of said space region; and wherein said space region has substantially the same cross-sectional area from an upper end portion thereof to a lower end portion thereof in the axial direction of said channel box.

11. A fuel assembly as defined in claim 10, wherein said predetermined portion of said channel box is a central portion of said channel box in the transverse direction, and at least four of said moderator rods are disposed immediately adjacent to said space region so that each of said four moderator rods faces said space region and forms a part of a boundary thereof.

12. A fuel assembly as defined in claim 11, wherein each of said moderator rods is a water rod and said water rods are arranged symmetrically with respect to said space region.

13. A fuel assembly as defined in claim 10, wherein said space region region is adapted to be filled with water when said fuel assembly is loaded in a core of a nuclear reactor.

* * * * *